United States Patent
Kahn et al.

(10) Patent No.: US 9,609,370 B2
(45) Date of Patent: Mar. 28, 2017

(54) VIDEO DELIVERY MODIFICATION BASED ON NETWORK AVAILABILITY

(75) Inventors: Colin Kahn, Morris Plains, NJ (US); Edward Grinshpun, Freehold, NJ (US); Raziel Haimi-Cohen, Springfield, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1116 days.

(21) Appl. No.: 13/118,772

(22) Filed: May 31, 2011

(65) Prior Publication Data

US 2012/0311651 A1 Dec. 6, 2012

(51) Int. Cl.
| | |
|---|---|
| *H04N 7/16* | (2011.01) |
| *H04N 21/238* | (2011.01) |
| *H04N 21/24* | (2011.01) |
| *H04N 21/41* | (2011.01) |
| *H04N 21/845* | (2011.01) |

(52) U.S. Cl.
CPC ... *H04N 21/23805* (2013.01); *H04N 21/2402* (2013.01); *H04N 21/4126* (2013.01); *H04N 21/8456* (2013.01)

(58) Field of Classification Search
CPC ......... H04N 21/47202; H04N 7/17318; H04N 7/17336; H04N 21/2402; H04N 21/25891; H04W 28/02
USPC ........ 725/67–68, 70–71, 80–81, 93–96, 116, 725/146, 62; 455/436, 450
See application file for complete search history.

(56) References Cited

U.S. PATENT DOCUMENTS

| | | | |
|---|---|---|---|
| 5,754,733 A | 5/1998 | Gardner et al. | |
| 5,963,202 A * | 10/1999 | Polish | 715/723 |
| 6,041,316 A | 3/2000 | Allen | |
| 6,483,596 B1 * | 11/2002 | Philippi et al. | 356/614 |
| 6,546,555 B1 * | 4/2003 | Hjelsvold et al. | 725/1 |
| 6,826,593 B1 | 11/2004 | Acharya et al. | |
| 7,617,516 B2 * | 11/2009 | Huslak | H04N 7/152 725/86 |
| 8,385,199 B1 * | 2/2013 | Coward | H04W 28/02 370/230.1 |

(Continued)

FOREIGN PATENT DOCUMENTS

CA 2715362 A1 3/2011

*Primary Examiner* — Jason Salce
(74) *Attorney, Agent, or Firm* — Ryan, Mason & Lewis, LLP

(57) ABSTRACT

A video server or other processing device obtains availability information for a wireless network and modifies a manner in which video segments of a video service are delivered to a user device over the wireless network based on the obtained availability information. The availability information may comprise at least one of network congestion measurement information and transmission pricing information. In an illustrative embodiment, the processing device comprises a video server configured to utilize the availability information to generate a list of video segments available for transmission for at least a portion of the video service, to provide the list of video segments to the user device responsive to a request received from the user device, to receive an additional request from the user device for at least one particular video segment identified in the list, and to provide the requested at least one video segment to the user device.

20 Claims, 3 Drawing Sheets

(56) References Cited

U.S. PATENT DOCUMENTS

| | | | |
|---|---|---|---|
| 2003/0074670 A1* | 4/2003 | Penk | H04N 7/17318 |
| | | | 725/96 |
| 2003/0101454 A1* | 5/2003 | Ozer et al. | 725/42 |
| 2003/0118243 A1* | 6/2003 | Sezer | G06T 9/005 |
| | | | 382/245 |
| 2004/0025191 A1* | 2/2004 | McDermott-Walsh et al. | 725/136 |
| 2004/0098748 A1 | 5/2004 | Bo et al. | |
| 2004/0240390 A1* | 12/2004 | Seckin | H04L 47/10 |
| | | | 370/252 |
| 2005/0251838 A1* | 11/2005 | Chandhok | H04L 29/06027 |
| | | | 725/95 |
| 2006/0230176 A1* | 10/2006 | Dacosta | 709/235 |
| 2008/0301749 A1* | 12/2008 | Harrar et al. | 725/131 |
| 2009/0187947 A1* | 7/2009 | Stasi et al. | 725/47 |
| 2010/0027487 A1 | 2/2010 | Ihm et al. | |
| 2010/0118114 A1 | 5/2010 | Hosseini et al. | |
| 2010/0186025 A1* | 7/2010 | Thomas et al. | 725/5 |
| 2010/0299703 A1* | 11/2010 | Altman | 725/48 |
| 2011/0032324 A1 | 2/2011 | George et al. | |
| 2011/0170408 A1* | 7/2011 | Furbeck | H04L 47/10 |
| | | | 370/230 |

* cited by examiner

VIDEO DELIVERY MODIFICATION BASED ON NETWORK AVAILABILITY

TECHNICAL FIELD

The present invention relates generally to communication systems that include wireless networks, and more particularly to techniques for delivering video over a wireless network to user devices in a communication system.

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

The explosive growth in the transmission of video over wireless networks has in many cases had an adverse impact on subscriber experience. Conventional approaches to controlling delivery of video over wireless networks include adaptive streaming techniques in which a video server attempts to match the rate at which video is delivered to a given user device to the available bandwidth sensed by an application running on that device.

Using this localized per-device optimization approach, each user device application will generally attempt to maximize its own individual throughput without regard to the impact it may have on other applications running on other user devices and receiving video over the same wireless network. From the perspective of the wireless network service provider, "low value" applications which require high bandwidth may compete on shared wireless network channels with "high value" applications that require less bandwidth. This can lead to a significant degradation in performance for the high value applications, and a corresponding loss in revenue for the wireless network service provider.

SUMMARY OF THE INVENTION

Various illustrative embodiments of the present invention provide improved techniques for delivery of video over wireless networks. For example, one or more these illustrative embodiments utilize explicit information on availability of a given wireless network, such as network congestion measurement information or associated transmission pricing information, to control delivery of a video service to a user device over that wireless network. Such arrangements provide improved throughput by performing video delivery modification based on network availability.

In one embodiment, a video server or other processing device obtains availability information for a wireless network and modifies a manner in which video segments of a video service are delivered to a user device over the wireless network based on the obtained availability information. The availability information may comprise at least one of network congestion measurement information and transmission pricing information.

By way of example, the processing device may comprise a video server configured to utilize the availability information to generate a list of video segments available for transmission for at least a portion of the video service, to provide the list of video segments to the user device responsive to a request received from the user device, to receive an additional request from the user device for at least one particular video segment identified in the list, and to provide the requested at least one video segment to the user device.

The list may identify a plurality of video segments of the video service that the user device is permitted to request within a designated time interval so as to ensure that delivery requirements determined for the video service based on the availability information will be satisfied for that time interval. Also, the steps of providing a list of video segments to the user device, receiving an additional request from the user device for at least one particular video segment identified in the list, and providing the requested at least one video segment to the user device are repeated for each of a plurality of time intervals in satisfying the determined delivery requirements for respective portions of the video service.

The illustrative embodiments provide considerable advantages. For example, a video server or other processing device configured in accordance with one or more of these embodiments dynamically adapts to variations in technology constraints and operating conditions of a wireless network, thereby enhancing the subscriber experience and the throughput performance of the system.

These and other features and advantages of the present invention will become more apparent from the accompanying drawings and the following detailed description.

DETAILED DESCRIPTION OF THE INVENTION

The invention will be described herein in conjunction with illustrative embodiments of communication systems, wireless networks, processing devices and associated video delivery modification processes. It should be understood, however, that the invention is not limited to use with the particular systems, networks, devices and processes described, but is instead more generally applicable to any communication system application in which it is desirable to provide improved throughput by performing video delivery modification based on network availability.

Figure 1:
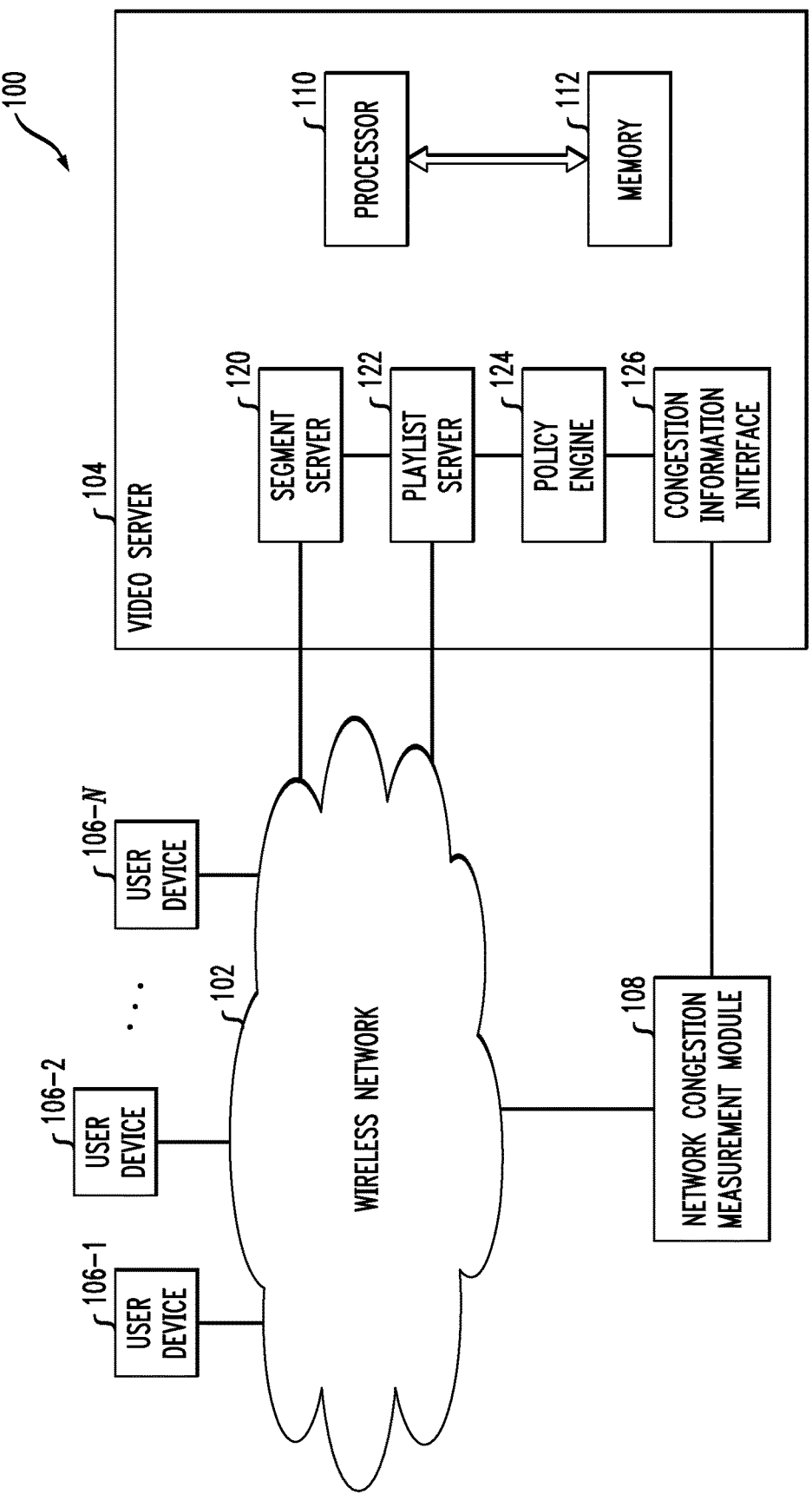
FIG. 1 shows a communication system with video delivery modification in a first embodiment of the invention.

FIG. 1 shows an illustrative embodiment of a communication system 100 comprising a wireless network 102 and a video server 104. The video server 104 is coupled to the wireless network 102 and is configured to communicate with an arbitrary number of user devices 106-1, 106-2, ... 106-N over the wireless network 102. Associated with the wireless network 102 is a network congestion measurement module 108. Although this module is shown as separate from the wireless network 102 in the present embodiment, it may be at least partially incorporated into network equipment of the wireless network in other embodiments. The network congestion measurement module 108 provides network congestion measurement information for the wireless network 102 to the video server 104, which may reside within a content delivery network.

The wireless network 102 may be configured in accordance with any of a number of known wireless communication standards, including without limitation GPRS, UMTS, HSPA, LTE, WiFi, WiMax, 3G1X, EV-DO/HRPD/ eHRPD, Bluetooth and Zigbee, and in a given embodiment may support multiple such standards. The wireless network 102 may therefore comprise multiple separate sub-networks each configured in accordance with a different standard.

In one possible implementation, the wireless network 102 may comprise an arrangement of multiple base stations, controllers and other associated network elements configured to support communication with the user devices 106 over one or more air interfaces. The wireless network 102 may also comprise other types of network elements, such as routers and switches, for communicating with the processing devices and other components of the video server 104. The module 108 may be implemented at least in part within any such network element of the wireless network 102.

The video server 104 in the present embodiment is generally configured to obtain availability information for the wireless network 102, and to modify a manner in which video segments of a video service are delivered to a user device over the wireless network based on the obtained availability information.

We have recognized that a conventional video server is generally unaware of the constraints imposed by the capabilities of the particular technology utilized by the wireless network over which the content is delivered, as well as the current operating conditions of that wireless network, and in any event is unable to adapt efficiently to variations in those constraints or conditions.

The previously-described conventional adaptive streaming is problematic in that it attempts to optimize the video delivery to particular individual user device applications, without regard to the performance of the wireless network as a whole. Although such an approach can respond quickly to changing reception conditions at the individual user devices, it cannot handle global wireless network congestion in an effective manner, and therefore may result in some devices obtaining more than their fair share of wireless network resources while others receive insufficient resources. Another potential consequence of this localized per-device optimization is frequent oscillations in bandwidth, which may cause noticeable and objectionable variations in video quality. Implementation of known fairness-based scheduling algorithms in the wireless network fails to provide an adequate solution to the problem.

It is to be appreciated that this network availability information in the present embodiment is distinct from other types of information, such as available bandwidth as seen by a particular user device, that are determinable by monitoring a communication channel data path associated with the user device. As noted above, in conventional adaptive streaming, a video server attempts to match the rate at which video is delivered to a given user device to the available bandwidth sensed by an application running on that device. The network availability information utilized in the present embodiment is distinct from such localized per-device available bandwidth information, and instead provides a global view of network congestion conditions or transmission pricing that can be used to optimize the performance of the wireless network as a whole.

The video server 104 comprises a processor 110 coupled to a memory 112, and is an example of what is more generally referred to herein as a "processing device." Such a processing device will generally also comprise one or more transceivers, or other types of conventional communication circuitry, which allow the device to communicate with other processing devices or system components. The processor 110 may comprise a microprocessor, a microcontroller, an application-specific integrated circuit (ASIC), a field-programmable gate array (FPGA) or other type of processor, as well as portions or combinations of such devices. The memory 112 may comprise an electronic random access memory (RAM), a read-only memory (ROM), a disk-based memory, or other type of storage device, as well as portions or combinations of such devices.

The processor 110 and memory 112 may be used in storage and execution of one or more software programs for controlling delivery of video segments of a video service over wireless network 102 as described herein. The memory 112 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination. The memory 112 may therefore comprise, again by way of example, one or more processing device memories or separate disk arrays, network-attached storage devices, or other types of storage devices, in any combination.

The video server 104 may additionally or alternatively include other types of circuitry suitably modified to operate in the manner described herein. Conventional aspects of such circuitry are well known to those skilled in the art and therefore will not be described in detail herein.

The network elements of the wireless network 102 may communicate with processor 110 or other components of the video server 104 using other types of networks that are not explicitly shown in the figure. These other types of networks may comprise, for example, a wide area network such as the Internet, a metropolitan area network, a local area network, a cable network, a telephone network, a satellite network, as well as portions or combinations of these or other networks. The term "network" as used herein is therefore intended to be broadly construed.

The video server 104 in the present embodiment further comprises a segment server 120, a playlist server 122, a policy engine 124, and a congestion information interface 126. The congestion information interface 126 is configured to obtain network congestion measurement information for the wireless network 102 via the module 108. The network congestion measurement information may be viewed as an example of what is more generally referred to herein as "availability information" of the wireless network.

The network congestion measurement information obtained via interface 126 may comprise, for example, user device measurements that are aggregated over a specified cell area of the wireless network and are further consolidated with network state information of the wireless network. As more particular examples, the network congestion measurement information may comprise one or more of network element processor occupancy, network element dropped packet rate, network element ingress queue depth, air interface slot utilization, packet round-trip time, and number of active user devices waiting for service. The network congestion measurement information may be obtained via an application programming interface (API) associated with a network element of the wireless network 102 that is utilized to implement at least a portion of the network congestion measurement module 108.

Network congestion measurement information may also or alternatively indicate differences in congestion between different available network types. For example, if both UMTS and LTE wireless networks are available for communicating with a given user device, the network congestion measurement information may indicate the relative congestion of the UMTS and LTE networks (e.g., the UMTS network is congested but the LTE network is not congested).

Although the present embodiment utilizes network congestion measurement information to control modification of video delivery, other embodiments can utilize other types of information generally indicative of availability of the wireless network 102. Such information may include, for example, transmission pricing information, which may be used in place of or in addition to network congestion measurement information. Examples of transmission pricing information that may be utilized in embodiments of the invention include a price per transmitted data unit, a set of prices for transmission at different qualities of service, or other related parameters, such as a minimum time duration for which a specified price is guaranteed.

The network congestion measurement information may be translated into transmission pricing information, using a demand curve which maps congestion to price. Higher price means lower demand and consequently less congestion. The wireless network service provider may set the price at any point as long as the resulting demand is within the capacity of the wireless network. Naturally, the service provider will set the price at the level which maximizes its revenue.

It is possible that the demand curve itself may change over time for various reasons. For example, in an embodiment in which the video service to be delivered comprises advertisements, rush hour travelers may have less patience for advertisements than those traveling at other times. As the demand curve changes, the price also changes even though the actual network congestion may not change. It should also be noted that the price at the same congestion level may vary at different service locations, due to differences in available infrastructure, cost of operations, third party agreements, regulations, etc. Accordingly, as a user travels from one location to another within the service area of the wireless network 102, the network availability as reflected in transmission pricing may change even though the network congestion remains the same.

As noted above, the components 120, 122 and 124 of video server 104 may be implemented at least in part using software that runs on processor 110. Also, the congestion information interface 126 may be implemented at least in part utilizing a transceiver of the video server 104.

It is also to be appreciated that a video server as disclosed herein may be implemented using modules, interfaces, devices and components other than those specifically shown in the exemplary arrangement of FIG. 1.

As indicated previously, conventional video servers are generally unaware of the constraints imposed by the capabilities of the particular technology utilized by the wireless network over which the content is delivered, as well as the current operating conditions of that wireless network, and in any event are unable to adapt to variations in those constraints or conditions in a manner that would improve the subscriber experience or the throughput performance of the system. The present embodiment advantageously overcomes these drawbacks of conventional practice at least in part by providing a mechanism for dynamic modification of video segment delivery based on network availability information which may comprise, for example, network congestion measurement information or related transmission pricing information.

The operation of the video server 104 in an illustrative embodiment will now be described with reference to the flow diagram of FIG. 2. The video delivery modification process shown in the diagram includes steps 200 through 214, which in the present embodiment may be assumed to be performed utilizing at least components 120, 122, 124 and 126 of the video server 104.

In step 200, the video server 104 obtains network congestion measurement information for the wireless network 102 via the congestion information interface 126 and the associated module 108. As indicated previously, the network congestion measurement information may comprise user device measurements that are aggregated over a specified cell area and consolidated with network state information of the wireless network, including one or more of network element processor occupancy, network element dropped packet rate, network element ingress queue depth, air interface slot utilization, packet round-trip time, and number of active user devices waiting for service. This is in contrast to conventional arrangements, which as mentioned above include adaptive streaming techniques that attempt to match the rate at which content is delivered to a given user device to the available bandwidth sensed by an application running on that device.

In step 202, the video server 104 determines delivery requirements for a given video service based on the network congestion measurement information. This operation is performed at least in part utilizing one or more established delivery policies implemented using policy engine 124.

In step 204, a list of video segments available for transmission to a given user device 106 is generated, for a current portion of the video service. This list of segments is more particularly referred to herein as a "playlist." The list may be generated by the playlist server 122, possibly operating in conjunction with or under the control of the policy engine 124, and need not take any particular form. The list may identify a plurality of video segments of the video service that the user device 106 is permitted to request within a designated time interval, so as to ensure that the delivery requirements determined in step 202 for the video service will be satisfied for that time interval. The term "video service" as used herein is intended to be broadly construed so as to encompass any type of content delivery service that involves transmission of video to a user device over a wireless network, such as video on demand, video file downloading, etc.

The video segments identified in the playlist for a designated time interval of the type described above may comprise, for example, video segments each having a data rate at or below a maximum data rate established by the determined delivery requirements. The video server 104 may therefore have multiple video segments available for a given portion of the video service with each such video segment having a different data rate, and the playlist of video segments provided to the user device for the given portion of the video service may comprise only a subset of the multiple video segments available for that portion. The playlist in such an arrangement therefore serves to restrict a data rate for the video service as delivered to the requesting user device by limiting the user device to selection of video segments with particular data rates. It should be noted that, depending on the nature of the video service and the policy of the associated video content provider, the generated segmented video content might include inserted video advertisements.

In step 206, the playlist server 122 provides the playlist of video segments to the user device 106 responsive to a request received from the user device. Delivery of the playlist to the wireless network 102 for transmission to the user device 106 may be over a conventional network connection. The present embodiment does not require the use of any particular communication mechanism between wireless network 102 and video server 104. As mentioned previously, those system entities may be interconnected using any of a variety of different types of local or wide area networks.

In step 208, an additional request is received from the user device for at least one particular video segment identified in the playlist. Again, such a request can be provided from the wireless network 102 to the video server 104 over a conventional network connection.

In step 210, the requested at least one video segment is transmitted to the user device over the wireless network. As one possible variant, an alternative video segment may instead be transmitted to the user device over the wireless network. The alternative video segment may contain the same video content as the requested segment, but at a different bit rate. This type of substitution may occur, for example, in response to a change in network availability after the playlist has been provided to the user device in step 206. Thus, the video server 104 may under certain conditions override the request from the user device and provide another segment that better suits the current conditions and policy.

In step 212, a determination is made as to whether or not additional portions of the video service are remaining to be delivered to the user device 106. If there are no such additional portions, the video service delivery is complete, as indicated in step 214. Otherwise, steps 204, 206, 208 and 210 are repeated for one or more additional portions of the video service. Thus, the steps of providing a playlist of video segments to the user device, receiving an additional request from the user device for a particular video segment identified in the list, and providing the requested video segment to the user device may be repeated for each of a plurality of time intervals in satisfying the determined delivery requirements for respective portions of the video service.

Figure 2:
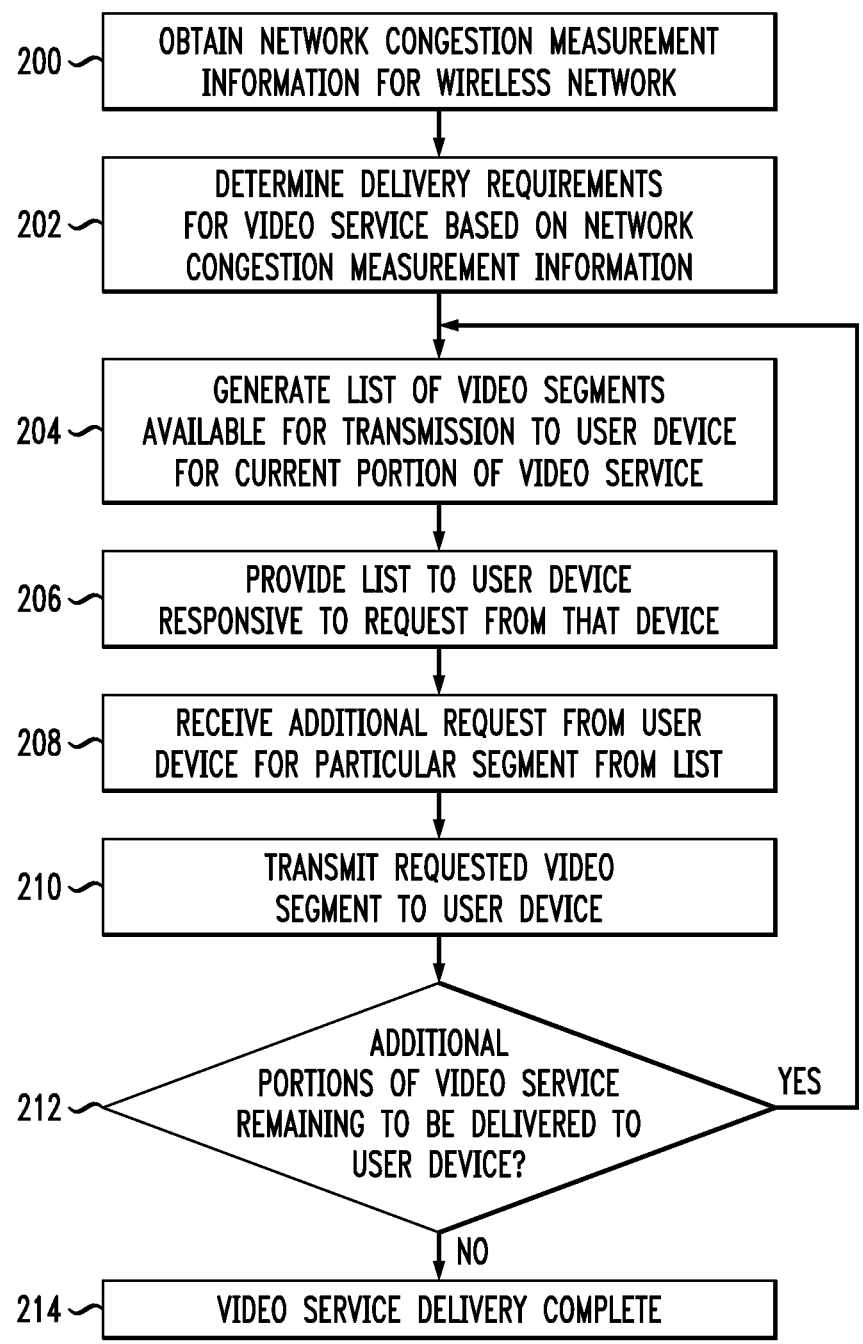
FIG. 2 is a flow diagram of a video delivery process of the FIG. 1 system.

The particular process steps and their ordering as shown in the flow diagram of FIG. 2 are presented by way of illustrative example only, and additional or alternative steps may be used in other embodiments. Also, the ordering of the process steps may be varied, and certain steps shown as being performed serially may be performed at least in part concurrently with one or more other steps.

In the FIG. 2 embodiment, the configuration of the playlist serves to limit the user device selections to only those video segments that will satisfy the delivery requirements based on the network congestion measurement information. This ensures that no individual user device will be able to undermine the overall operating objectives of the wireless network 102 as reflected in the policies associated with policy engine 124. However, in other embodiments, the user may be provided with a broader array of selection options, with the video server 104 being configured to override one or more parameters of a delivery request for the video service from the user device if the user device requests delivery of the video service in a manner inconsistent with the network congestion measurement information obtained in step 200.

Also, the policies implemented by policy engine 124 may comprise advertising policies, in which case modifying the manner in which the video segments are delivered to the user device 106 may comprise altering an advertising policy associated with delivery of the video service. For example, altering the advertising policy associated with delivery of the video service may comprise altering at least one of frequency and duration of advertisement delivery, altering a data rate utilized for advertisement delivery, altering an advertisement type, and directing reuse of a previously-delivered advertisement in place of delivery of another advertisement. In the case of reusing advertisements, the video server may indicate how often to repeat certain previously shown advertisements, assuming that the previously shown advertisements are available in the local memory of the user device and therefore do not need to be retransmitted.

In another embodiment of the invention, the playlist provided to the user device may indicate for particular video segments that those segments should be saved in local memory after being initially played. For example, the first time that a given advertisement is to be played on the user device, the playlist could indicate that the video segments corresponding to the given advertisement need to be saved in local memory so as to be available for repeated playing of that advertisement by the user device.

It should be noted that service providers are often concerned about the handling of rogue user devices. A rogue user device in the context of the present embodiments may be a device which, due to malfunctioning or deliberate hacking, does not follow the instructions in the playlist. This can manifest itself either in the user device requesting video segments which are not listed in the playlist, or by not requesting video segments which it is supposed to request, e.g., skipping advertisements by not requesting video segments corresponding to advertisements. The first problem may be avoided by providing in the playlist a password, which is valid only for a limited time, for each video segment specified. The segment server 120 will not provide the requested segment without the password, and thus segments not specified in the playlist cannot be retrieved.

In order to make sure that a user device requests and retrieves all of the video segments which it is supposed to retrieve, a mechanism may be used. One possible verification mechanism is to have the segment server 120 report to the playlist server 122 each time a user device retrieves a segment. An alternative mechanism is to embed a code in each video segment, such that when the user device requests the next playlist it has to include the codes of all the segments from the previous playlist. In yet another variant of this verification mechanism, the code may be embedded as a watermark in the video. This way, reporting the code insures not only that the specific video segment was retrieved, but also that it has been decoded.

In one or more of the embodiments described above, modifying the manner in which the video segments are delivered to the user device may further comprise, for example, increasing a data rate utilized for delivery of the video service to permit local caching of at least a portion of the delivered video for future playback by the user device. The video server may therefore operate in accordance with a "download ahead" policy, such that when congestion and price are low the user device may be directed by the video server to download video at a rate higher than real time and store the excess in local storage of the user device. Later, when congestion and price go up, the transmission rate can be decreased by the video server to a rate lower than the real time rate and playback may be from local storage.

Figure 3:
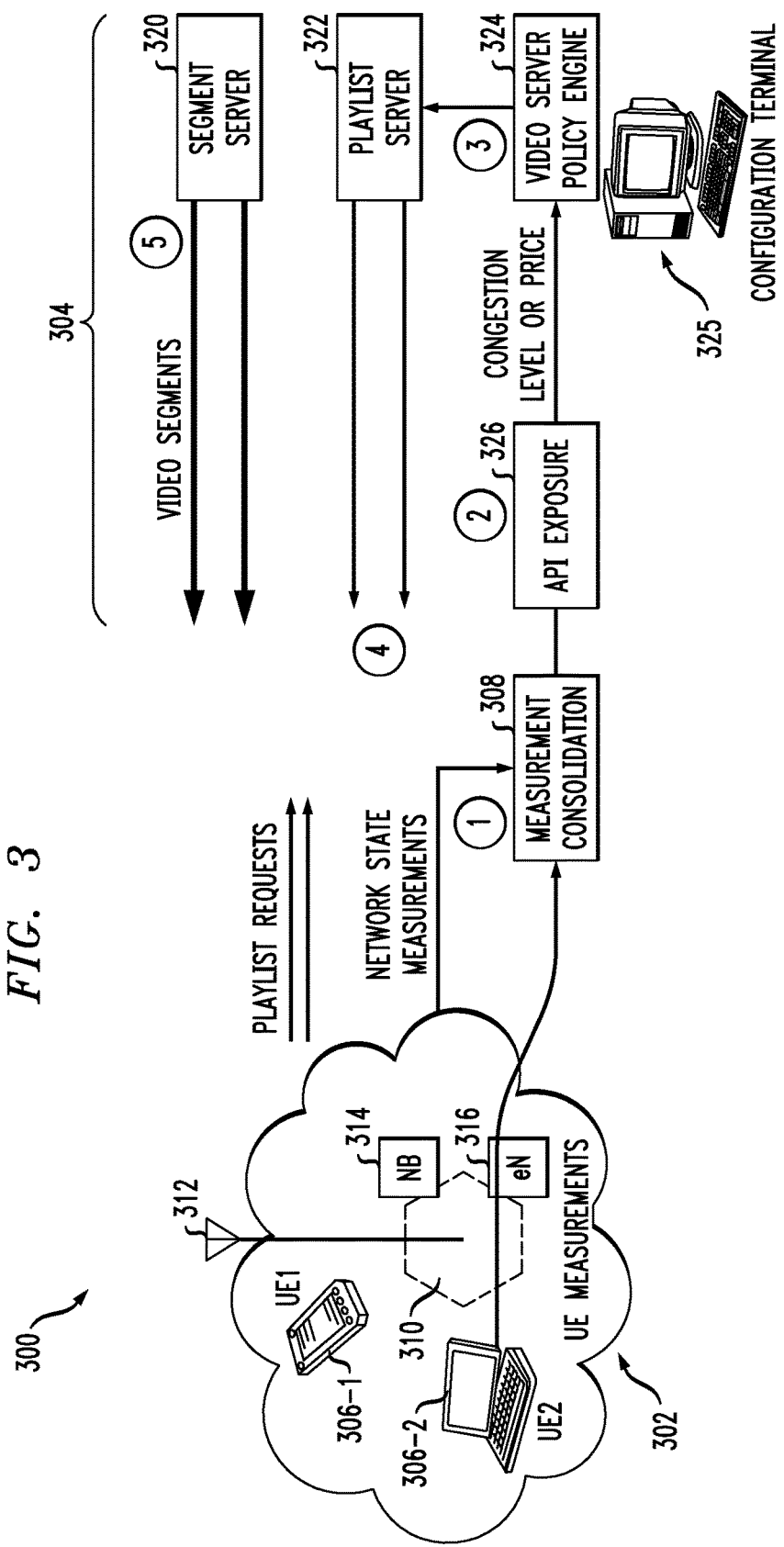
FIG. 3 is a diagram illustrating the operation of a communication system with video delivery modification in another embodiment of the invention.

Another illustrative embodiment of the invention is shown in FIG. 3. In this embodiment, a communication system 300 comprises a wireless network 302 and a video server 304. The wireless network 302 communicates with a plurality of user devices 306, including wireless mobile devices 306-1 and 306-2, in a cell 310 via an associated base station 312. The user devices in this embodiment are also more specifically referred to as user equipment or UE. The wireless network 302 includes or has otherwise associated therewith a measurement consolidation module 308. The wireless network 302 includes additional network elements such as Node B 314 and enhanced Node B 316. Conventional operations of wireless network elements such as 312, 314 and 316 are well known and are therefore not described in further detail herein.

The video server 304 comprises a segment server 320, a playlist server 322, a video server policy engine 324 and a configuration terminal 325. The configuration terminal 325 is utilized to enter information for establishing delivery policies of the video server 304, and may be co-located with or remote from the video server 304. The video server 304 obtains network congestion measurement information via an API exposure point 326 which is associated with measurement consolidation module 308 or another network element of the wireless network 302.

The video server 304 is advantageously configured to modify delivery of video segments of a video service to a plurality of user devices such as devices 306 associated with wireless network 302. As in the embodiments described previously, the video segment delivery modification is based on network availability information, which in the present embodiment is assumed to include network congestion measurement information or associated transmission pricing information.

More particularly, the video delivery in the present embodiment is modified based on explicit feedback from the wireless network 302 that indicates the congestion level. The feedback may be in the form of actual congestion levels, or it may be in the form of a variable price paid by the video server 304 for wireless network access, where the price is correlated with congestion levels. The former is appropriate for video server applications under wireless network service provider control since such service providers have a vested interest in ensuring that subscribers streaming high rate video do not interfere with other subscribers using shared wireless network resources such as the air interface. Pricing access for third party video server applications according to wireless network congestion levels provides a similar motivation for those applications.

The video server 304 may utilize a variety of different mechanisms to modify the delivery of video segments based on network congestion or pricing information in the FIG. 3 embodiment. For example, the video server may set a limit on the maximum bit rate that will be used for a time interval associated the duration of a network congestion level. During periods when there is no congestion, meaning that there is idle capacity in the cell 310, the video streaming rate may be limited only by the results of conventional user device based available bandwidth sensing of the type described previously. During periods when the network indicates congestion, the bandwidth allowed for the streaming video is reduced to a lower level.

Other examples include adjusting the rate or duration of advertisements to offset increases in delivery cost, or replaying advertisements which have been previously downloaded to local storage in the UE. Thus, when congestion or price is low, advertisements and other video content may be downloaded in advance into the UE local storage so that when the price is high the subscriber would be able to play the content from the local storage instead of using the network to obtain such content. Also, if the congestion or price is high, the video content provider may switch the subscriber to work with another access network or another service provider, or may ask the subscriber to pay a premium for continuing to provide the content despite the increase in congestion or price.

These and other video delivery modification techniques of the type disclosed herein help free resources in the network for other user devices that wish to receive service, and provide an efficient mechanism for wireless network service providers to manage congestion in their networks. Such arrangements not only enhance the subscriber experience and the throughput performance of the system, but also avoid the need for user device application providers to modify their applications to interface with APIs of particular types of network equipment in the wireless network.

Referring again to FIG. 3, the diagram also shows steps involved in an exemplary video delivery modification process. The steps are more particularly denoted as step 1 through step 5 in the diagram.

In step 1, measurements are obtained from the wireless network 302 and associated multiple user devices 306 to determine the network congestion state. Measurements from multiple sources are consolidated into one or more metrics that will be used to determine how the video server 304 modifies video delivery. The UE measurements are aggregated over the cell area and combined with network state measurements. Backhaul and network element information indicating congestion along the bearer path to the user devices may also be included in such information. The resulting network congestion information may additionally or alternatively be represented by a price for access to the wireless network 302 that can be communicated to video server 304. Such price information is an example of what is more generally referred to herein as "transmission pricing information."

In step 2, the network congestion measurement information and its associated price information are provided to the video server 304 via the API exposure point 326. The API exposure point may comprise a secure interface with one or more network elements of the wireless network 302. The video server can access such APIs to retrieve the network congestion and price information.

In step 3, the video server policy engine 324 receives the congestion and pricing information from the wireless network 302. It maps this information into delivery requirements for a particular video service. The requirements could specify the maximum video encoding bitrate, frequency and quality of inserted advertisements, and other information that the video server may use to provide the video service. For example, the maximum rate may be inversely related to the congestion level. This mapping may in addition vary depending on other factors such as the user device type (e.g., smartphone, tablet, laptop computer, etc.), user subscription level (e.g., gold, silver, bronze, etc.) and other factors.

In step 4, the playlist server 322 uses the mapped requirements to generate a conforming playlist of video segments to be sent to the video application in the requesting user device. The playlist may be sent when the user device video application sends a request for the video segments for a next time interval (e.g., 30 seconds). The playlist identifies video segments that the user device video application may request during the time interval. More particularly, the playlist sent to the user device contains conforming video segments such that the data rate to the user device will not exceed the maximum rate. Based upon the playlist received, the video application at the user device may request only a subset of the video segments available from the video server, namely, those segments that comply with the rate restriction. For example, each 30-second playlist could provide one or more segment identifiers for each of 15 two-second video segments. The server may have available segment sizes for a particular two-second interval of a requested video that range from 200 Kbps to 5 Mbps. However, if the maximum bit rate were set at 1 Mbps due to network congestion or pricing information, only two-second segments less than or equal to 2 Mbit in size would be identified in the playlist. In addition or alternatively, the playlist may contain instructions as to the rate at which segments may be retrieved, such as at real time, faster than real time or slower than real time. Although corresponding to respective time intervals in this example, video segments in other embodiments may be defined in other ways, such as corresponding to a particular number of video frames.

In step 5, using the playlist provided by the playlist server 322, the video application at the user device requests the desired video segments from the video server 304, and the selected video segments are then delivered by the segment server 320. The bit rate is restricted by the maximum video segment size that the user device may request as stipulated in the playlist. In addition, the user device may use conventional adaptive streaming mechanisms to further lower the data rate below the maximum allowed by the rate restriction. This is done by requesting segments of smaller size than the maximum allowed by the rate restriction.

As in the case of the FIG. 2 flow diagram, the particular process steps shown in the FIG. 3 diagram are presented by way of illustrative example only, and may be varied in other embodiments.

The techniques disclosed herein provide significant advantages to wireless network service providers. For example, these techniques provide an efficient mechanism that allows wireless network service providers to control congestion by addressing one of the primary sources of increasing congestion, namely, video delivery services. The mechanism in one or more of the illustrative embodiments alters the manner in which a video stream is sent to a user device so that a maximum rate or other restrictions stipulated by the wireless network service provider are not exceeded. It takes into account congestion levels of the overall network, and provides a viable alternative to simply adding additional equipment to serve an expanding subscriber base.

As mentioned above, embodiments of the present invention may be implemented at least in part in the form of one or more software programs that are stored in a memory or other computer-readable storage medium of a video server or other processing device. As an example, video server components such as the segment server 120, playlist server 122 and policy engine 124 of FIG. 1 may each be implemented at least in part using one or more software programs.

Of course, numerous alternative arrangements of hardware, software or firmware in any combination may be utilized in implementing these and other system elements in accordance with the invention. For example, video servers or other processing devices in illustrative embodiments of the present invention may be implemented in one or more ASICs, FPGAs or other types of integrated circuit devices, in any combination. Such integrated circuit devices, as well as portions or combinations thereof, are examples of "circuitry" as the latter term is used herein.

It should again be emphasized that the embodiments described above are presented for purposes of illustration only, and should not be interpreted as limiting in any way. Other embodiments may use different types of wireless networks, video servers, processing device and memory configurations, and video delivery modification processes, depending on the needs of the particular application. Alternative embodiments may therefore utilize the techniques described herein in a wide variety of other contexts in which it is desirable to provide improved performance in terms of delivering video over a wireless network by modification of video segment delivery based on availability information. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising the steps of:
obtaining availability information for a wireless network; and
modifying a manner in which video segments of a video service are delivered to a given user device over the wireless network based on the obtained availability information;
wherein the obtaining and modifying steps are performed by a video server communicatively connected to the wireless network;
the video server being configured to obtain the availability information at least in part from the wireless network;
wherein the availability information comprises network congestion measurement information for the wireless network;
wherein the network congestion measurement information comprises aggregated measurements for a plurality of user devices, the aggregated measurements for the plurality of user devices being aggregated over a specified cell area of the wireless network; and
wherein modifying a manner in which video segments of the video service are delivered to the given user device over the wireless network comprises the video server selecting particular video segments for identification in a playlist delivered by the video server to the given user device based at least in part on the aggregated measurements of the network congestion measurement information.

2. The method of claim 1 wherein the availability information further comprises transmission pricing information.

3. The method of claim 1 wherein the step of modifying the manner in which the video segments are delivered to the given user device further comprises the steps of:
determining delivery requirements for the video service based on the availability information;
generating the playlist of video segments available for transmission for at least a portion of the video service in accordance with the determined delivery requirements;
providing the playlist of video segments to the given user device responsive to a request received from the given user device;
receiving an additional request from the given user device for at least one particular video segment identified in the playlist; and
providing the requested at least one video segment to the given user device.

4. The method of claim 3 wherein the playlist identifies a plurality of video segments of the video service that the given user device is permitted to request within a designated time interval so as to ensure that the determined delivery requirements for the video service will be satisfied for that time interval.

5. The method of claim 4 wherein the steps of providing the playlist of video segments to the given user device, receiving an additional request from the given user device for at least one particular video segment identified in the playlist, and providing the requested at least one video segment to the given user device are repeated for each of a plurality of time intervals in satisfying the determined delivery requirements for respective portions of the video service.

6. The method of claim 4 wherein the video segments identified in the playlist for the designated time interval comprise video segments each having a data rate at or below a maximum data rate established by the determined delivery requirements.

7. The method of claim 3 wherein the video server provides the video service and has multiple video segments available for a given portion of the video service with each such video segment having a different data rate, and wherein the playlist of video segments provided to the given user device for the given portion of the video service comprises only a subset of the multiple video segments available for that portion.

8. The method of claim 3 wherein the playlist is configured to restrict a data rate for the video service as delivered to the given user device by limiting the given user device to selection of video segments with particular data rates.

9. The method of claim 1 wherein the aggregated measurements for the plurality of user devices are further consolidated with network state information of the wireless network in the network congestion measurement information.

10. The method of claim 1 wherein the network congestion measurement information comprises one or more of network element processor occupancy, network element dropped packet rate, network element ingress queue depth, air-interface slot utilization, packet round-trip time, and number of active user devices waiting for service.

11. The method of claim 1 wherein the video server provides the video service and obtains the availability information via an application programming interface associated with a network element of the wireless network.

12. The method of claim 1 wherein the availability information comprises information other than that determinable by monitoring a communication channel data path associated with the given user device.

13. The method of claim 1 wherein the video server provides the video service and is configured to override one or more parameters of a delivery request for the video service from the given user device if the given user device requests delivery of the video service in a manner inconsistent with the availability information.

14. The method of claim 1 wherein the video server provides the video service and is configured to provide an alternative video segment in place of a video segment requested by the given user device, based on the availability information.

15. The method of claim 1 wherein the step of modifying the manner in which the video segments are delivered to the given user device further comprises altering an advertising policy associated with delivery of the video service, and wherein altering the advertising policy associated with delivery of the video service comprises one or more of altering at least one of a frequency and a duration of advertisement delivery, altering a data rate utilized for advertisement delivery, altering an advertisement type, and directing reuse of a previously-delivered advertisement in place of delivery of another advertisement.

16. The method of claim 1 wherein the step of modifying the manner in which the video segments are delivered to the given user device further comprises increasing a data rate utilized for delivery of the video service to permit local caching of at least a portion of the delivered video for future playback by the given user device.

17. An article of manufacture comprising a non-transitory computer-readable storage medium having embodied therein executable program code that when executed by a processor of a processing device causes the processing device to perform the steps of the method of claim 1.

18. A video server comprising:
an interface configured to obtain availability information for a wireless network;
a processor; and
a memory coupled to the processor;
wherein the video server is configured under control of the processor to modify a manner in which video segments of a video service are delivered to a given user device over the wireless network based on the obtained availability information;
wherein the availability information comprises network congestion measurement information for the wireless network;
wherein the network congestion measurement information comprises aggregated measurements for a plurality of user devices, the aggregated measurements for the plurality of user devices being aggregated over a specified cell area of the wireless network; and
wherein modifying a manner in which video segments of the video service are delivered to the given user device over the wireless network comprises the video server selecting particular video segments for identification in a playlist delivered by the video server to the given user device based at least in part on the aggregated measurements of the network congestion measurement information.

19. The video server of claim 18 further comprising:
a policy engine coupled to the interface and configured to determine delivery requirements for the video service based on the availability information;
a playlist server configured to generate the playlist of video segments available for transmission for at least a portion of the video service in accordance with the determined delivery requirements, and to provide the playlist of video segments to the given user device responsive to a request received from the given user device; and
a segment server configured to receive an additional request from the given user device for at least one particular video segment identified in the playlist, and to provide the requested at least one video segment to the given user device.

20. An apparatus comprising:
a network element of a wireless network;
the network element having an interface accessible to a video server configured to communicate with a given user device over the wireless network;
wherein the network element provides availability information for the wireless network to the video server via the interface;
wherein the video server is further configured to modify a manner in which video segments of a video service are delivered to the given user device over the wireless network based on the availability information;
wherein the availability information comprises network congestion measurement information for the wireless network;

wherein the network congestion measurement information comprises aggregated measurements for a plurality of user devices, the aggregated measurements for the plurality of user devices being aggregated over a specified cell area of the wireless network; and wherein modifying a manner in which video segments of the video service are delivered to the given user device over the wireless network comprises the video server selecting particular video segments for identification in a playlist delivered by the video server to the given user device based at least in part on the aggregated measurements of the network congestion measurement information.

* * * * *